No. 647,600. Patented Apr. 17, 1900.
L. T. GIBBS.
RUNNING GEAR FOR AUTOMOBILES.
(Application filed Dec. 11, 1899.)
(No Model.) 2 Sheets—Sheet 2.
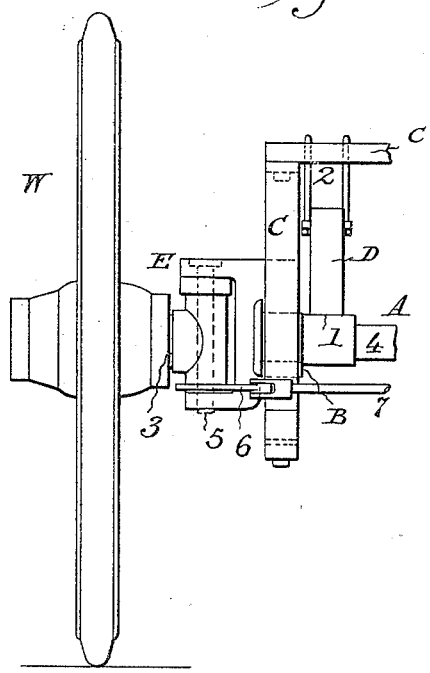
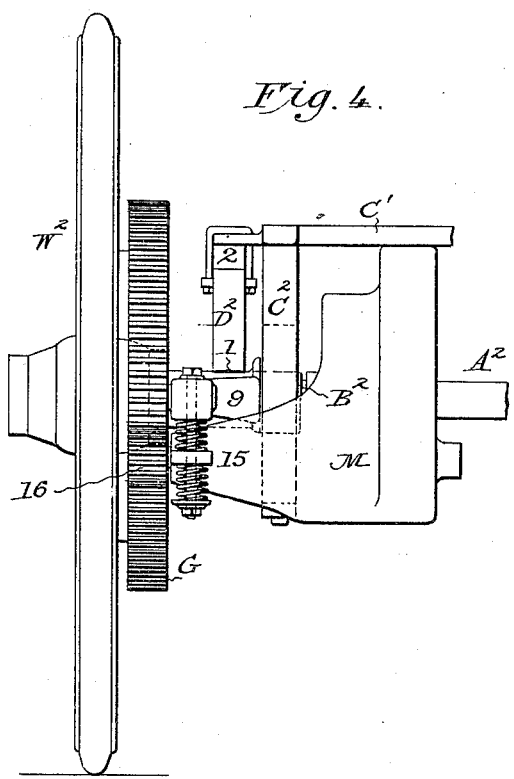
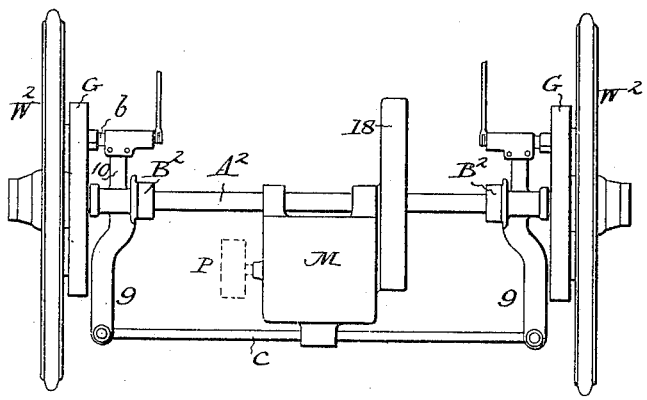

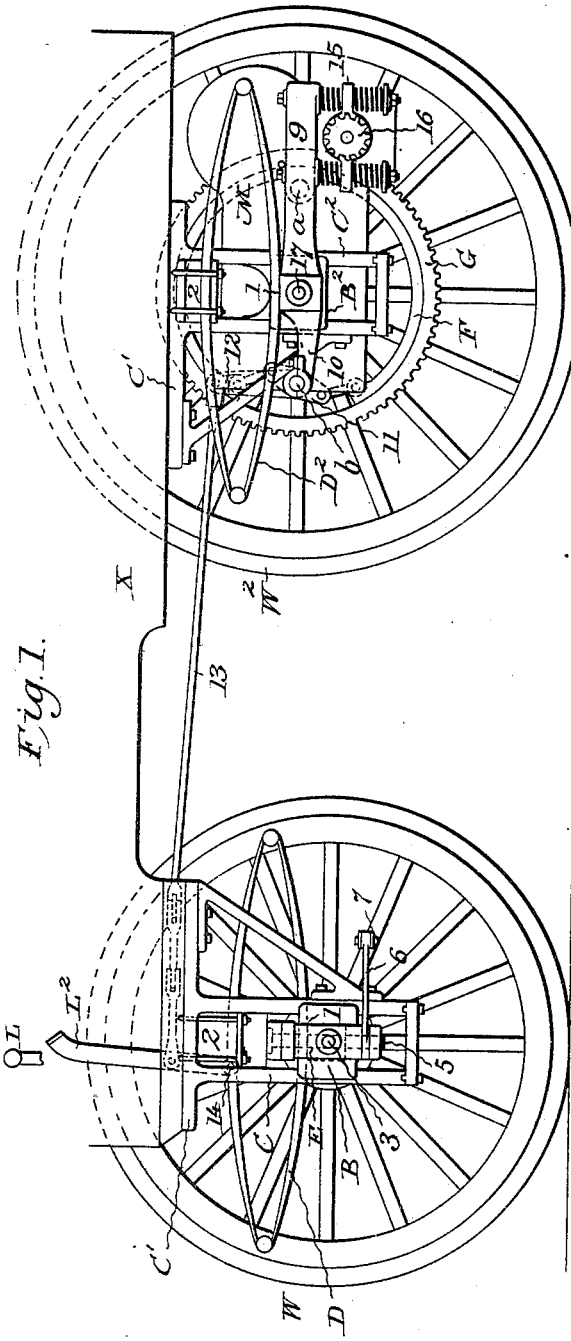

UNITED STATES PATENT OFFICE.

LUCIUS T. GIBBS, OF NEW YORK, N. Y., ASSIGNOR TO CLARENCE WAINWRIGHT WOOD, OF SAME PLACE.

RUNNING-GEAR FOR AUTOMOBILES.

SPECIFICATION forming part of Letters Patent No. 647,600, dated April 17, 1900.

Application filed December 11, 1899. Serial No. 739,955. (No model.)

*To all whom it may concern:*

Be it known that I, LUCIUS T. GIBBS, a citizen of the United States of America, and a resident of the borough of Manhattan, in the city and State of New York, have invented a new and useful Improvement in Running-Gear for Automobiles, of which the following is a specification.

This invention relates to automobiles of every description as regards motive power; and it consists in certain novel combinations of parts in their running-gear, as hereinafter set forth and claimed.

The leading objects of this invention are to wholly dispense with any connection whatever between the front and rear axles themselves and to render the four wheels as nearly independent of each other as practicable, and thus to secure greater flexibility in the running-gear. This is of great practical importance, as on rough roads the front wheel on one side may be six inches higher than the wheel directly behind it, or even the wheel on the same axle, due to ruts or stones.

Heretofore in automobiles the "reach" type of running-gear has been generally used in practice, the two axles being connected together fore and aft by a reach or reaches or an equivalent framework. In some cases the reaches are attached to the axles by a flexible connection; but severe twisting strains are inevitably present when two reach-connected axles are obliged to move in different horizontal planes. The present invention wholly dispenses with such connection.

Another object of this invention is to transmit directly to the sills of the body the strain due to driving the vehicle and the shocks due to the wheels striking depressions or stones in the roadway. In the reach type no connection of the running-gear to the body is made that is adapted to resist such strains and shocks in the first instance, except by the fastening of the springs to the body. The inertia of the body and its load must therefore be overcome by way of the leaves of the springs, and any shocks due to obstructions are taken in the same manner. By avoiding this the springs are not only protected and the employment of lighter and easier springs rendered practicable, but an even motion is imparted to the improved vehicle, differing greatly from that of automobiles in which the reach type of running-gear is used.

Other objects are to provide one of the axles, and preferably the front axle, with a pair of steering-heads and at the same time to connect such axle with the vehicle-body in harmony with above leading objects; to support a brake mechanism, and preferably one of the band type, in effective working relation to a pair of wheels by means of pedestal-boxes, and to carry the whole weight of the motor or motors, and preferably a pair of such motors, upon one and the same axle, whereby steering-heads forming part of the other axle are subjected to less strain and the accomplishment of said leading objects is promoted.

The means whereby each of said objects is accomplished are hereinafter set forth with reference to two sheets of drawings which accompany this specification as part thereof.

Figures 1 and 2 of the drawings are small-scale side and top views of the improved running-gear, the near wheels and brake-band being removed in the side view. Figs. 3 and 4 are rear elevations, respectively, of the parts at one end of the front axle and those at one end of the rear axle; and Fig. 5 is a top view of the rear axle and its appurtenances of an improved single-motor equipment.

Like letters and numbers refer to like parts in all the figures.

In either form of the improved running-gear the axles A and $A^2$ of two pairs of wheels W and $W^2$ are effectively supported without any connection whatever between the axles themselves and so as to transmit strains and shocks from the wheels and axles to the sills of the body X directly, as aforesaid, by means of pairs of "boxes" B and $B^2$, movable vertically in pedestals C and $C^2$, which are bolted or otherwise rigidly attached at top to such sills and slotted or otherwise adapted to guide such pedestal-boxes and to limit their individual vertical movements. Each axle serves, together with a skeleton frame-plate $C'$ at top, to connect the pedestal-boxes of its pair with each other, so as to render the respective pedestals mutually braced against spreading or otherwise yielding to lateral strains, and suitable springs D and D², preferably fore-and-aft elliptical springs, as represented, are interposed between seats 1 and caps 2, carried, respectively, by the pedestal-boxes individually and by said frame-plate C', immediately beneath the bottom of the body X.

In each of the improved equipments also the steering-axle A comprises axle-spindles 3, Fig. 3, distinct from its body or tie-and-strut portion 4. The ends of the latter are keyed fast in the pedestal-boxes B, and the axle-spindles form parts of the steering-heads E, which may be and preferably are of a known form, comprising vertical pivots 5, connecting the axle spindles and boxes, and lever-arms 6 on the spindle parts, these lever-arms being connected by a rod 7, having connections 8, Fig. 2, with the steering-lever L, that is operated by the driver. In both arrangements, moreover, each of the rear pedestal-boxes B² is constructed with rigid supporting-arms 9 and 10, preferably and conveniently distinct and horizontal, as represented. Of these arms the first serves to support a pivot-pin $a$, which holds a brake-band F in working position within an annular gear G or an equivalent brake-ring that is attached to the inner side of the adjacent rear wheel W², concentric with its axle-spindle. The arm 10 serves to support a short rock-shaft $b$, connected by a toggle-joint 11 in customary manner with the ends of the brake-band for applying the brake and by a crank-arm 12 and connections 13 with the brake-operating lever L², which is conveniently fulcrumed at 14 to the bottom of the body X. The brake-band F may thus be supported within such gear or brake-ring G with the utmost nicety of alinement, and its effective operation is thus insured. Apart from such supports the specific form of brake mechanism indicated forms no part of the present invention.

Another feature common to both of the improved equipments is the construction of each of the rear pedestal-boxes B² (or one of them) with a rigid arm, which may be and preferably is said arm 9, to coact with the axle A² for the support of the motor or motors M, the whole weight of which is thus carried more directly than heretofore by this axle.

In the two-motor equipment, Figs. 1 to 4, inclusive, each of the rear pedestal-boxes B² is provided with said arms 9 and 10, and the shaft of each motor M has a shaft-casing 15 for attachment to said arm 9 and carries its pinion 16 contiguous to the corresponding one of said brake-rings G, which in this arrangement is an annular gear having its inner surface adapted to coact with a brake-band F within it and its outer surface adapted to mesh with said pinion 16. Such mesh may be of any approved kind. An effective support is thus afforded the motor immediately at said pinion. The rear axle A², which carries the principal weight of the motor, as aforesaid, is in this arrangement non-rotary and keyed fast in the pedestal-boxes B², but is preferably and conveniently integral with the axle-spindles 17, on which the wheels W² rotate.

In the single-motor equipment, Fig. 5, the axle A² is rotary, the pedestal-boxes B² being in this case provided with suitable axle-bearings, while the wheels W² are keyed fast on the protruding ends of the axle. This axle is, moreover, divided, as is customary, and connected by "differential gear" 18 with the shaft of the motor M, so that the two wheels may rotate independently or at different rates of speed when the vehicle is turned. Such differential gear is well known and forms no part of this invention. The motor-casing is connected with the supporting-arms 9 of the pedestal-boxes B² by a bridge-rod $c$, parallel with the axle A². The motor may consequently be located centrally or at any preferred point on the axle. The pedestals C² and springs D² (omitted in Fig. 5) may be the same or substantially the same as in the two-motor equipment. The brake-band F may be either internal or external, the brake-ring G having no other function than to coact therewith.

The bearings within the hubs of the wheels W and W², Figs. 1 to 4, and those within the pedestal-boxes B² in Fig. 5, and other details which have not been specified may be of any known or improved construction.

Brake mechanism of other forms and motors of various kinds may obviously be supported in part by the pedestal-boxes B² in substantially the manner above described. One of the arms 9 and 10 of each box may in some cases be omitted. The caps 2 of the springs D and D² may be attached directly or indirectly to the sills of the vehicle-body in any approved way. Springs may be interposed between said bridge-rod $c$ and the motor-casing in the single-motor equipment, Fig. 5, as between the motor-casings and the arms 9 in Figs. 1 and 4. Suitable brakes may be applied to pulleys P, Fig. 5, on the motor-shafts or on the rotary axle A² of the single-motor equipment, and other like modifications will suggest themselves to those skilled in the art.

Having thus described said improvement, I claim as my invention and desire to patent under this specification—

1. Improved running-gear for an automobile comprising two pairs of wheels with their axles, without connection between such axles themselves, vertically-movable pedestal-boxes connected in pairs by the respective axles and provided respectively with steering-heads and with brake and motor supports, springs interposed between said boxes and the bottom of the vehicle-body, and pedestals rigidly attached at top to the sills of said body, and serving to guide said boxes, and to transmit driving strain and shocks from wheel and axle directly to said sills.

2. The combination, in running-gear for automobiles, of a non-rotary steering-axle comprising a pair of axle-spindles and a tie-and-strut body portion, a pair of pedestal-boxes rigidly connected with each other by said body portion of the axle and forming in connection with said spindles and vertical pivots a pair of steering-heads, and a pair of pedestals attached at top to the vehicle-body and in which said boxes are free to move vertically.

3. The combination, in running-gear for automobiles, of a non-rotary front axle comprising a pair of axle-spindles and a tie-and-strut body portion, a pair of pedestal-boxes within which the ends of said body portion are keyed fast, a pair of steering-heads formed in part by said spindles and boxes and comprising vertical pivots, and a pair of pedestals attached at top to the vehicle-body and in which said boxes are free to move vertically.

4. The combination, in running-gear for automobiles, of an axle, a pair of pedestal-boxes supporting the same and provided with brake-supporting arms, pedestals attached to the vehicle-body and in which said boxes are free to move vertically, and brake mechanism supported in part by said arms.

5. The combination, in running-gear for automobiles, of an axle, a pair of pedestal-boxes supporting the same and provided with brake-supporting arms, pedestals attached to the vehicle-body, and in which said boxes are free to move vertically, brake-bands and means for applying the same supported in part by said arms, and wheels mounted on said axle and provided with concentric brake-rings coacting with said bands.

6. The combination, in running-gear for automobiles, of an axle, a pair of pedestal-boxes supporting the same and provided with brake-supporting arms, pedestals attached to the vehicle-body, and in which said boxes are free to move vertically, brake-bands and means for applying the same supported in part by said arms, and wheels mounted on said axle and provided with concentric brake-rings within which said brake-bands are expanded.

7. The combination, in running-gear for automobiles, of an axle, a pair of pedestal-boxes supporting the same and provided with motor-supporting arms, and pedestals attached to the vehicle-body and in which said boxes are free to move vertically, a motor or motors supported by said axle and supporting-arms, a pair of wheels, and means for transmitting motion from said motors to said wheels.

8. The combination, in running-gear for automobiles, of an axle, a pair of pedestal-boxes supporting the same and provided with motor-supporting arms, pedestals attached to the vehicle-body and in which said boxes are free to move vertically, a pair of motors supported by said axle and supporting-arms, a pair of independently-rotating wheels, and means for driving each wheel by the corresponding motor.

9. The combination, in running-gear for automobiles, of a non-rotary axle, a pair of pedestal-boxes fast on said axle and provided with motor-supporting arms, pedestals attached to the vehicle-body, and in which said boxes are free to move vertically, a pair of motors supported by said axle and supporting-arms, a pair of independently-rotating wheels loose on the protruding axle-spindles at the extremities of said axle, and means for driving each wheel by the corresponding motor, substantially as hereinbefore specified.

LUCIUS T. GIBBS.

Witnesses:
CLARENCE W. WOOD,
E. A. CORTELYOU.